(12) United States Patent
Inoue

(10) Patent No.: US 11,693,730 B2
(45) Date of Patent: Jul. 4, 2023

(54) REPLACEABLE UNIT AND APPARATUS TO WHICH THE REPLACEABLE UNIT IS ATTACHED

(71) Applicant: CANON KABUSHIKI KAISHA, Tokyo (JP)

(72) Inventor: Naoki Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 17/172,120

(22) Filed: Feb. 10, 2021

(65) Prior Publication Data

US 2021/0255919 A1 Aug. 19, 2021

(30) Foreign Application Priority Data

Feb. 18, 2020 (JP) .............................. JP2020-025399

(51) Int. Cl.
*G06F 11/00* (2006.01)
*G06F 11/10* (2006.01)
*G03G 21/18* (2006.01)
*G06F 1/26* (2006.01)

(52) U.S. Cl.
CPC ..... *G06F 11/1004* (2013.01); *G03G 21/1878* (2013.01); *G06F 1/26* (2013.01)

(58) Field of Classification Search
CPC ........... G03G 15/0863; G03G 21/1878; G03G 21/1882; G06F 1/26; G06F 11/1004
See application file for complete search history.

(56) References Cited

U.S. PATENT DOCUMENTS

| | | | | |
|---|---|---|---|---|
| 5,995,774 A | * | 11/1999 | Applegate | .......... G03G 21/1889 399/27 |
| 7,546,469 B2 | | 6/2009 | Suzuki et al. | |
| 8,675,754 B1 | * | 3/2014 | Yonge, III | ................ H04L 5/12 375/261 |
| 2004/0090832 A1 | * | 5/2004 | Asauchi | ............... B41J 2/17546 365/200 |
| 2005/0108559 A1 | * | 5/2005 | Suzuki | ............. G06K 19/06009 713/193 |
| 2005/0120260 A1 | * | 6/2005 | Suzuki | ................ G06F 11/0733 714/5.1 |

(Continued)

FOREIGN PATENT DOCUMENTS

JP 2005-149416 A 6/2005

*Primary Examiner* — Albert Decady
*Assistant Examiner* — Enamul M Kabir
(74) *Attorney, Agent, or Firm* — Venable LLP

(57) ABSTRACT

A replaceable unit includes a communication unit to perform communication with a main body, and a non-volatile memory storing code information indicating whether a configuration of an error detection code is a first configuration or a second configuration. The communication unit stores, in a volatile memory, the code information, executes the communication in accordance with the code information in the volatile memory, and, upon receiving a change command, updates the code information stored in the volatile memory. The first configuration uses an error detection code of a first code length, the second configuration uses an error detection code of a second code length longer than the first code length, and the first configuration is used for the change command in order to change from the first configuration to the second configuration.

14 Claims, 7 Drawing Sheets

(56) References Cited

U.S. PATENT DOCUMENTS

| | | | |
|---|---|---|---|
| 2007/0071458 A1* | 3/2007 | Tanaka | B41J 2/17546 399/12 |
| 2007/0071459 A1* | 3/2007 | Nakazato | G03G 15/55 399/12 |
| 2009/0168807 A1* | 7/2009 | Nakatsugawa | G06K 7/0008 370/498 |
| 2013/0297928 A1* | 11/2013 | Wyss | G06F 9/44505 713/100 |
| 2015/0349919 A1* | 12/2015 | Engelien-Lopes | H04L 1/0061 714/807 |
| 2016/0139860 A1* | 5/2016 | Mitobe | G06F 13/00 358/1.14 |
| 2017/0140344 A1* | 5/2017 | Bowers | G06Q 10/06311 |
| 2017/0346990 A1* | 11/2017 | Lee | H04N 1/4433 |
| 2019/0020442 A1* | 1/2019 | Lyu | H04L 1/1671 |
| 2019/0044651 A1* | 2/2019 | Nakada | H04L 1/00 |
| 2019/0158125 A1* | 5/2019 | Carlough | H04L 1/0041 |

* cited by examiner

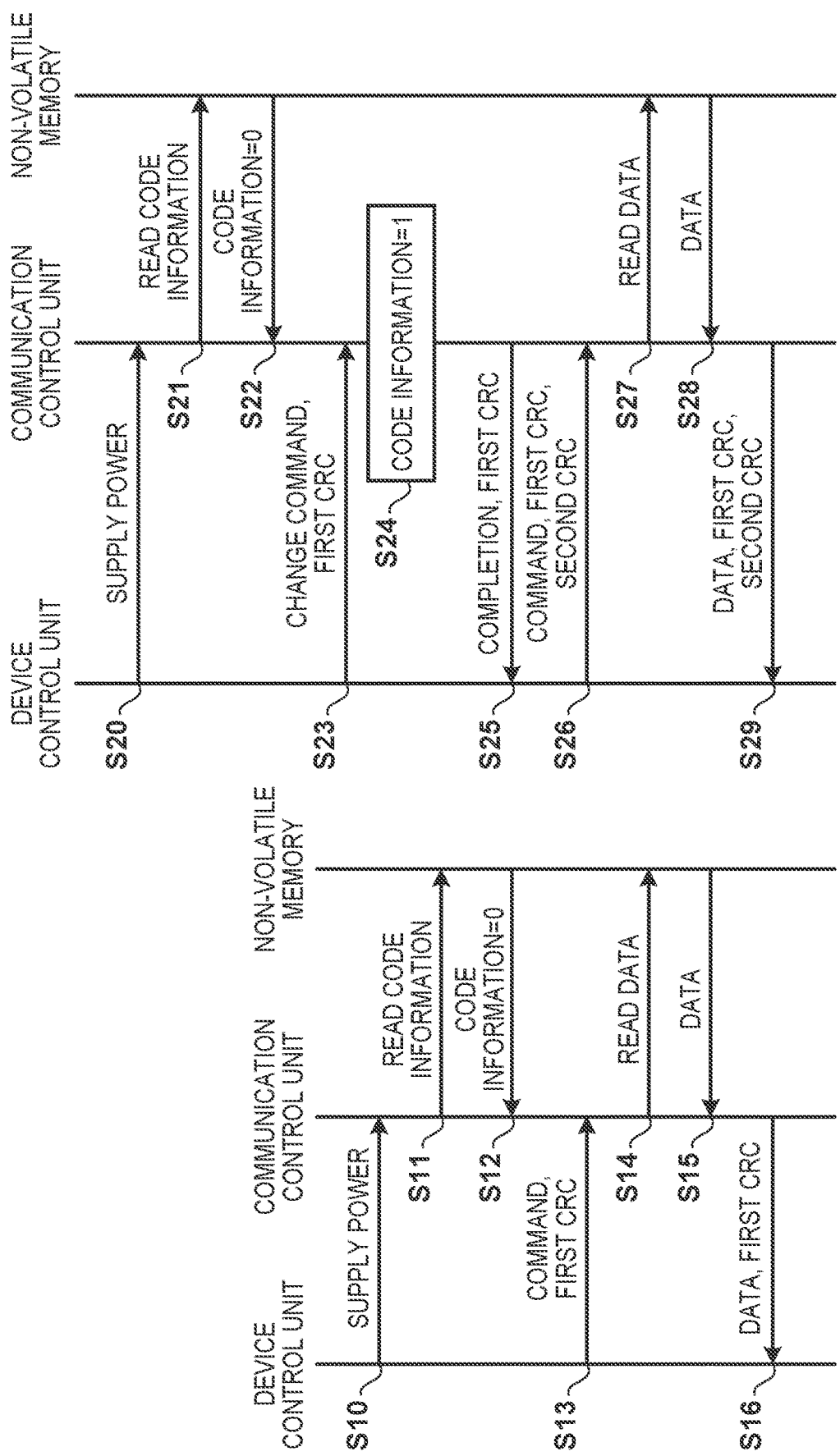

REPLACEABLE UNIT AND APPARATUS TO WHICH THE REPLACEABLE UNIT IS ATTACHED

BACKGROUND OF THE INVENTION

Field of the Invention

The present invention relates to a communication technique between a replaceable unit and a main body of an apparatus to which the replaceable unit is attached.

Description of the Related Art

An image forming apparatus uses consumables such as toner for image formation. The image forming apparatus includes components or members whose lifetime is shorter than its main body. Therefore, the image forming apparatus is configured so that a unit including such consumables or a unit including short-lived components or members are replaceable. In the following, a unit including such consumables and units including short-lived components or members are referred to as a replaceable unit. Such a replaceable unit is provided with a storage device for storing various types of information (parameters) or the like required for image formation using the replaceable units. A control unit of the image forming apparatus accesses a storage device of an attached replaceable unit to acquire parameters, and performs image formation according to the acquired parameters.

US-2005-108559 discloses an approach that applies an error detection code to communication between the control unit of the image forming apparatus and the storage device of the replaceable unit. Applying an error detection code is detecting a bit error due to noise or the like by adding a bit (hereinafter, redundant bit) for error detection to the communication data. Requesting retransmission in response to error detection allows for performing highly reliable communication.

Recent image forming apparatuses are facing an increase of length of data transmitted and received at a time in communication between the control unit and the storage device. Along with the increase of data length, there is an increased probability that an error occurs in at least one bit in the data transmitted at a time. Here, using an error detection code of a short code length (length of redundant bits) for a long data length may increase the probability of erroneously determining that no error has occurred, although an error has actually occurred. Therefore, it is necessary to increase the code length of the error detection code along with the increase of data length.

Here, a newly released replaceable unit is configured to be available not only for the latest model at the time, but also for existing models as far back as to a predetermined generation. Therefore, the storage device of the replaceable unit must be configured to be communicable not only with a new model using an error detection code of a long code length, but also with an older model supporting only an error detection code of a short code length. In other words, the replaceable unit must be configured to be communicable with a plurality of types of apparatus bodies from different generations.

SUMMARY OF THE INVENTION

According to an aspect of the present disclosure, a replaceable unit to be attached to a main body of an apparatus includes: a communication unit configured to perform communication with the main body; a non-volatile memory storing code information indicating whether a configuration of an error detection code applied to data transmitted and received in the communication is a first configuration or a second configuration; and a volatile memory. The communication unit is further configured to store, in the volatile memory, the code information stored in the non-volatile memory, execute the communication in accordance with the code information stored in the volatile memory, and, upon receiving data indicating a change command from the main body, update the code information stored in the volatile memory in accordance with the change command, the first configuration uses an error detection code of a first code length, the second configuration uses an error detection code of a second code length that is longer than the first code length, and the first configuration is used for the change command in order to change from the first configuration to the second configuration.

Further features of the present invention will become apparent from the following description of exemplary embodiments with reference to the attached drawings.

BRIEF DESCRIPTION OF THE DRAWINGS

FIGS. 5A and 5B are sequence diagrams of communication between a main body of an image forming apparatus and a storage device according to an embodiment;

DESCRIPTION OF THE EMBODIMENTS

Figure 1:
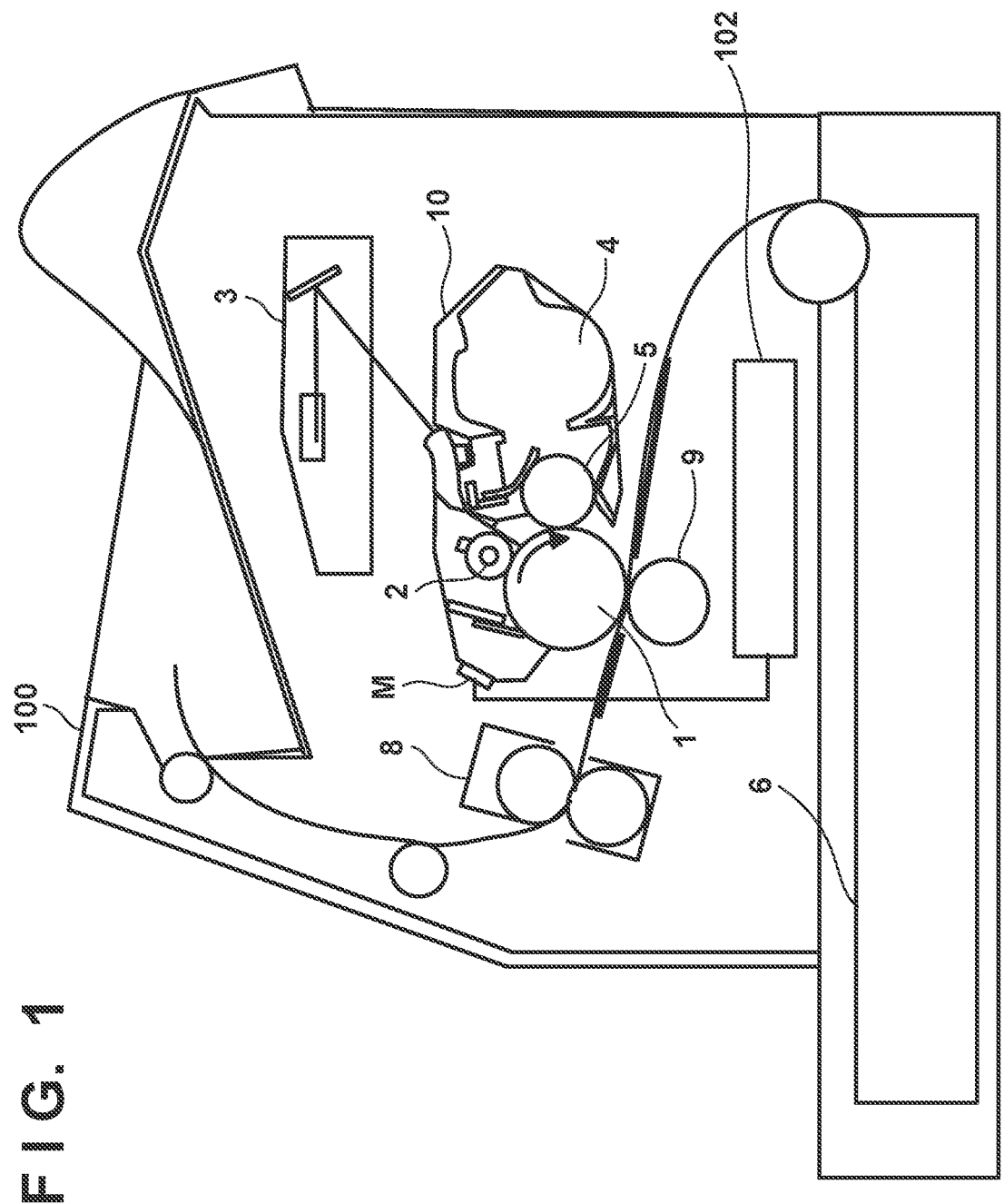
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus 100 according to the present embodiment. The image forming apparatus 100 has a process cartridge (hereinafter simply referred to as cartridge) 10 attached thereto. A cartridge 10 includes a photoconductor 1, a charge roller 2, a developing device 4 including a developing roller 5, and a storage device M. The cartridge 10, being a replaceable unit, is attachable to and detachable from the main body of the image forming apparatus 100. When forming an image, the photoconductor 1 is driven to rotate clockwise direction in the drawing. The charge roller 2 charges the surface of the photoconductor 1 to a uniform potential. An exposure unit 3 exposes the charged photoconductor 1 based on image data indicating an image to be formed, and forms an electrostatic latent image on the photoconductor 1. The developing roller 5 develops, with toner contained in the developing device 4, the electrostatic latent image formed on the photoconductor 1, and forms a toner image on the photoconductor 1.

A sheet contained in a cassette 6 is conveyed to a position opposite to the photoconductor 1 by a roller provided along a conveyance path. A transfer roller 9 transfers the toner image on the photoconductor 1 onto the sheet by outputting a transfer bias voltage. After the toner image has been transferred, the sheet is conveyed to a fixing device 8. The fixing device 8 fixes the toner image on the sheet by heating and pressurizing the sheet. After the toner image has been fixed, the sheet is discharged to the outside of the image forming apparatus 100. An engine control unit 102 controls respective members illustrated in FIG. 1 and also communicates with the storage device M of the cartridge 10.

Figure 2:
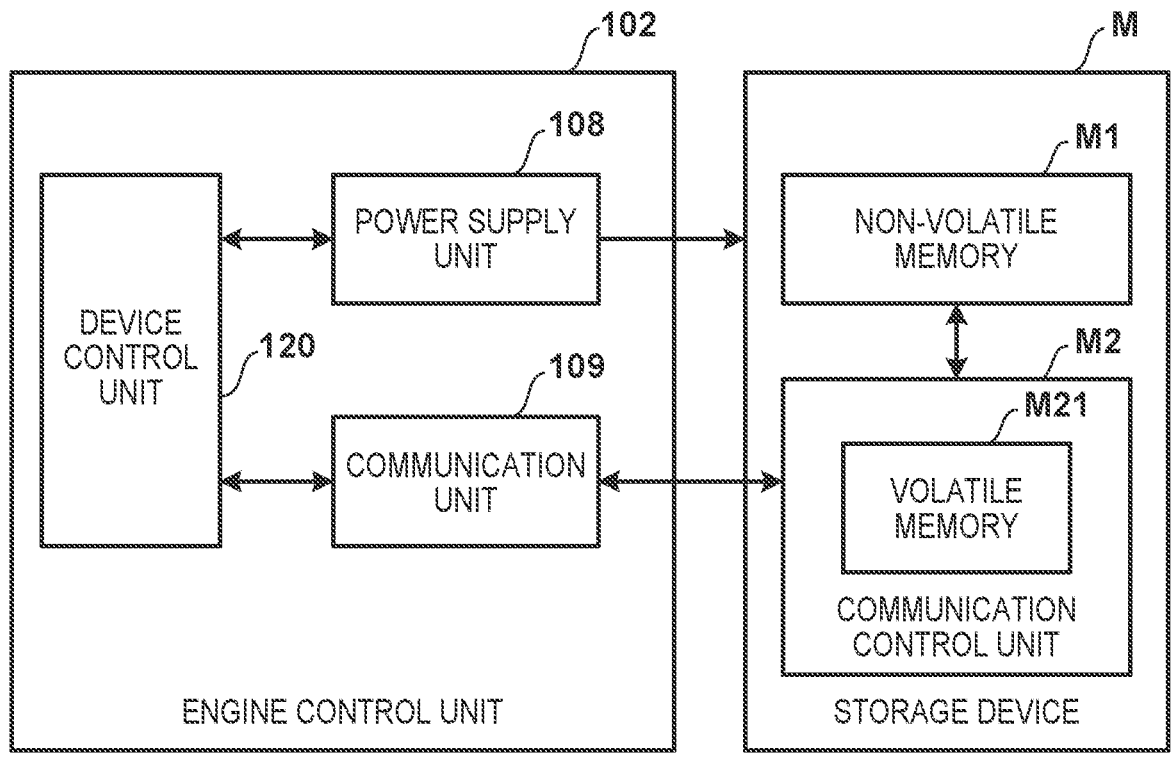
FIG. 2 is a configuration diagram of communication between an image forming apparatus and a storage device of a replaceable unit according to an embodiment.

FIG. 2 is a configuration diagram of communication between the engine control unit 102 and the storage device M. A power supply unit 108 supplies operation power to the storage device M of the cartridge 10. A communication unit 109 communicates with a communication control unit M2 of the storage device M. A device control unit 120 controls the storage device M via the power supply unit 108 and the communication unit 109. The storage device M includes a non-volatile memory M1 and a communication control unit M2. As has been described above, the communication control unit M2 communicates with the device control unit 120 via the communication unit 109. Here, the communication control unit M2 includes a volatile memory M21. The cartridge 10 and the image forming apparatus 100 are configured so that attaching the cartridge 10 to the image forming apparatus 100 causes the communication control unit M2 and the communication unit 109 to be connected via a communication line.

The non-volatile memory M1 stores the date of manufacture and the serial number of the cartridge 10. Furthermore, the nonvolatile memory M1 of the cartridge 10 stores various parameters required for image formation to be performed using the cartridge 10. Such parameters are preliminarily stored in the non-volatile memory M1 before shipping of the cartridge 10. In addition, the non-volatile memory M1 also stores information that varies along with the use of the cartridge 10. The information that varies along with the use of the cartridge 10 is, for example, toner remaining amount, cumulative number of sheets having images formed thereon, or the like. Here, initial values of such information are also preliminarily stored in the non-volatile memory M1 before shipping of the cartridge 10.

The device control unit 120 may instruct, via the communication unit 109, the communication control unit M2 to read the parameters or the like stored in the nonvolatile memory M1. Upon receiving from the device control unit 120 an instruction to read parameters or the like, the communication control unit M2 reads the parameters or the like stored in the nonvolatile memory M1, and transmits them to the device control unit 120 via the communication unit 109. In addition, the device control unit 120 can instruct, via the communication unit 109, the communication control unit M2 to update the information stored in the nonvolatile memory M1. Here, when updating the information, the device control unit 120 also notifies the communication control unit M2 of the updated value. Upon receiving from the device control unit 120 an instruction to update the predetermined information, the communication control unit M2 updates the predetermined information stored in the nonvolatile memory M1, and notifies the device control unit 120 of completion of the updating. An error detection code is used for communication between the device control unit 120 and the communication control unit M2. In the present embodiment, it is assumed to use a cyclic redundancy check (CRC) code as an error detection code. However, any error detection code may be used for communication between the device control unit 120 and the communication control unit M2.

The cartridge 10 may be used in a plurality of types of image forming apparatuses. In the following, it is assumed that the cartridge 10 can be used in type-A and type-B image forming apparatuses. The device control unit 120 of the type-A image forming apparatus uses only a CRC with a first bit length for communication with the storage device M. On the other hand, the type-B image forming apparatus is a newer model than the type-A image forming apparatus, and the device control unit 120 thereof can use both the CRC with the first bit length and a CRC with a second bit length which is longer than the first bit length for communication with the storage device M. Note that in the following description, the CRC with the first bit length is denoted first CRC, and the CRC with the second bit length is denoted second CRC.

Figure 3A:
FIGS. 3A to 3C illustrate a frame structure according to an embodiment.

FIG. 3A illustrates a frame structure (or packet structure) used for communication between the type-A image forming apparatus and the storage device M. A header is a bit pattern informing start of the frame. The device control unit 120 transmits a command to the storage device M, and the storage device M transmits, to the device control unit 120, data that is a response to the command. The first CRC is an error detection code for a command or data. In other words, whether or not an error has occurred in a commands/data can be detected with the first CRC. Note that, although it is depicted in the present embodiment that a frame transmitted by the device control unit 120 has a command stored therein, and a frame transmitted by the communication control unit M2 has data stored therein, the command is also data.

Figure 3B:
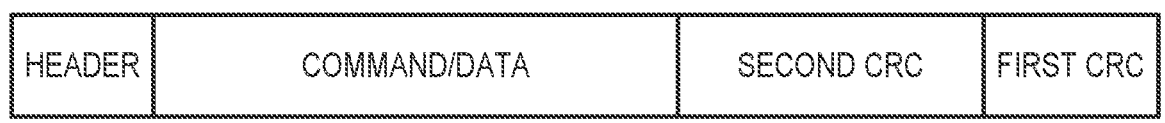

FIG. 3B illustrates a frame structure typically used for communication between the type-B image forming apparatus and the storage device M. The second CRC is an error detection code for commands or data. In other words, whether or not an error has occurred in commands/data can be detected with the second CRC. In addition, the first CRC is an error detection code for commands/data and the second CRC as a whole. In other words, whether or not an error has occurred somewhere in the commands/data and the second CRC can be detected with the first CRC. Here, the type-B image forming apparatus is configured so that it can selectively use the frame structure of FIG. 3A and the frame structure of FIG. 3B. Similarly, the communication control unit M2 of the storage device M is configured so that it can selectively use the frame structure of FIG. 3A and the frame structure of FIG. 3B.

The non-volatile memory M1 stores information indicating which of the frame structures in FIGS. 3A and 3B is to be used. The information is also information indicating the configuration of the error detection code, and therefore is referred to as code information. It is assumed in the present example that the frame structure of FIG. 3A is used when the code information is 0, and the frame structure of FIG. 3B is used when the code information is 1. Here, it is assumed that the initial value of the code information is 0. In other words, the frame structure of FIG. 3A is used in the initial state.

Figure 3C:
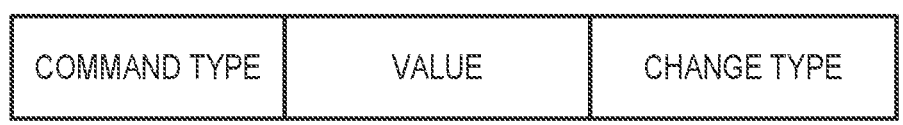

When the power supply unit 108 starts supplying power to the storage device M, the type-B image forming apparatus first transmits, to the storage device M, a change command for changing from the frame structure of FIG. 3A to the frame structure of FIG. 3B. Here, the change command is transmitted in the frame structure of FIG. 3A. FIG. 3C illustrates a structure of a change command. Here, all that is illustrated in FIG. 3C is stored in the commands/data field in FIG. 3A. The command type field stores a value indicating that the command is a change command. The value field stores the value of the changed code information. For example, when changing to the frame structure of FIG. 3B, a value "1" is stored in the value field. When returning from the frame structure of FIG. 3B to the frame structure of FIG. 3A, a value "0" is stored in the value field. Here, the change command for returning from the frame structure of FIG. 3B to the frame structure of FIG. 3A is transmitted in the frame structure of FIG. 3B. The change type field stores information indicating whether or not to update the value of the code information of the non-volatile memory M1.

Figure 4:
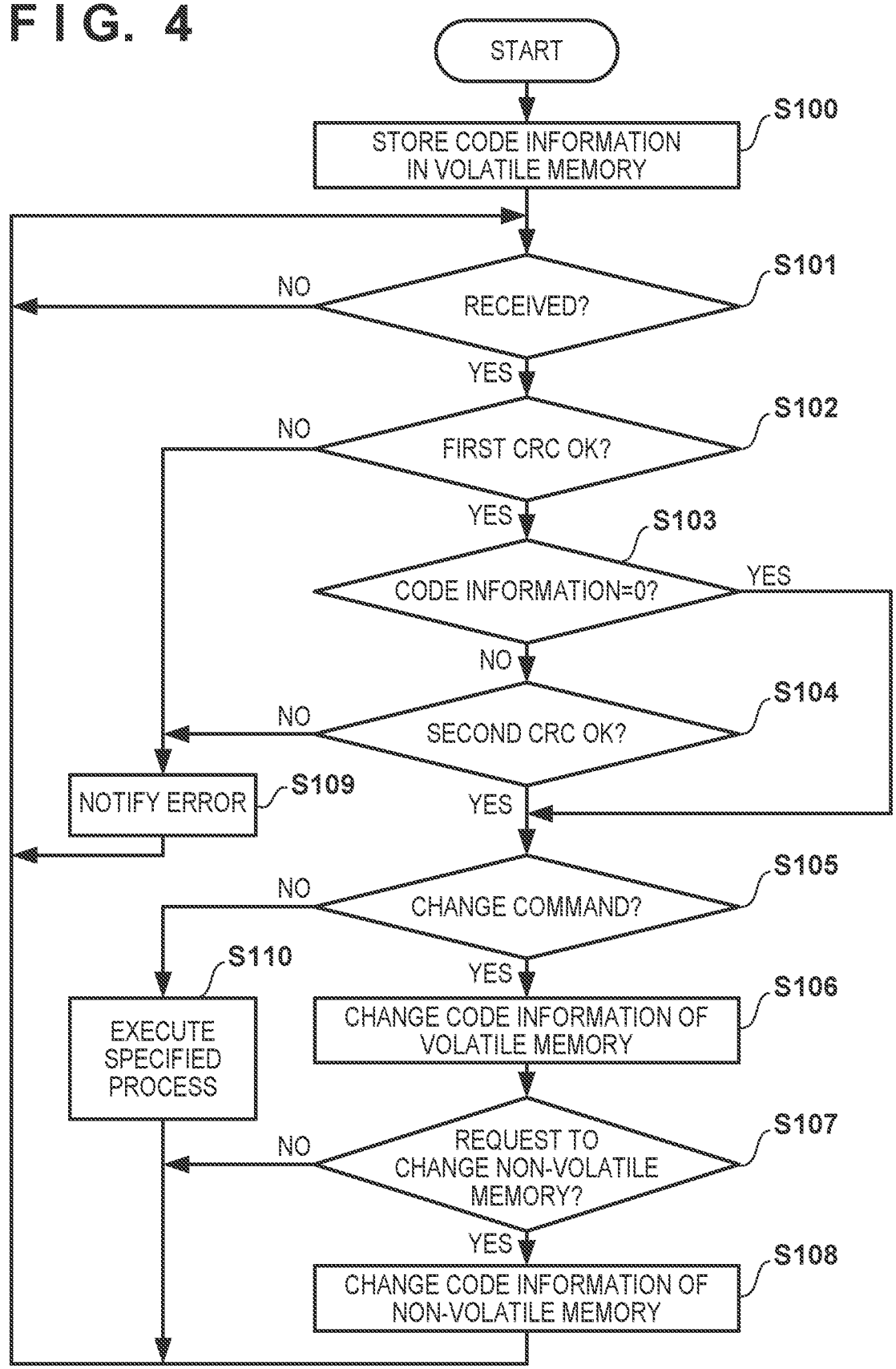
FIG. 4 is a flowchart of a communication process executed by a storage device according to an embodiment.

FIG. 4 is a flowchart of a communication process performed by the communication control unit M2 in the present embodiment. The process of FIG. 4 is started by starting power supply to the storage device M by the power supply unit 108. At S100, the communication control unit M2 reads code information from the non-volatile memory M1 and stores the code information in the volatile memory M21. When the code information stored in the volatile memory M21 is 0, the communication control unit M2 performs communication using the frame structure of FIG. 3A. In other words, error detection is performed only by the first CRC. When, on the other hand, the code information stored in the volatile memory M21 is 1, communication is performed using the frame structure of FIG. 3B. In other words, error detection is performed by the second CRC and the first CRC, respectively. Here, as has been described above, the initial value of the code information stored in the non-volatile memory M1 is 0.

The communication control unit M2 waits until a command is received from the device control unit 120 at S101. Upon receiving the command, the communication control unit M2 checks, at S102, whether or not an error has occurred based on the first CRC. When an error has occurred, the communication control unit M2 notifies the device control unit 120 at S109 that an error has occurred and repeats the process from S101. When, on the other hand, no error has occurred, the communication control unit M2 determines at S103 the value of the code information of the volatile memory M21. When the value of the code information is 0, the second CRC is not included, and thus the communication control unit M2 advances the process to S105. When, on the other hand, the value of the code information is 1, the communication control unit M2 checks, at S104, whether or not an error has occurred based on the second CRC. When an error has occurred, the communication control unit M2 notifies the device control unit 120 at S109 that an error has occurred and repeats the process from S101. In addition, when no error has occurred, the communication control unit M2 advances the process to S105.

At S105, the communication control unit M2 determines whether or not the received command is a change command. When the received command is not a change command, the communication control unit M2 performs a process according to the command at S110, and transmits the data to the device control unit 120. When, on the other hand, the received command is a change command, the communication control unit M2 changes at S106 the code information stored in the volatile memory M21 to the value of the value field. Subsequently, the communication control unit M2 determines at S107 whether or not a change is requested of the code information stored in the non-volatile memory M1. Whether or not a change is requested of the code information stored in the non-volatile memory M1 is determined by the value of the change type field. When no change has been requested of the code information stored in the non-volatile memory M1, the communication control unit M2 repeats the process from S101. When, on the other hand, a change is requested of the code information stored in the non-volatile memory M1, the communication control unit M2 changes at S108 the code information stored in the non-volatile memory M1, and repeats the process from S101.

FIG. 5A is a communication sequence diagram when the cartridge 10 is implemented on the type-A image forming apparatus. At S10, the device control unit 120 starts supplying power to the storage device M by the power supply unit 108. When the power supply is started, the communication control unit M2 accesses the non-volatile memory M1 at S11 in order to read code information, and acquires code information which is 0 (initial value) at S12. The value is stored in the volatile memory M21. The device control unit 120 transmits a command to the communication control unit M2 at S13. The command is transmitted in the frame structure of FIG. 3A. The communication control unit M2 accesses, at S14, the non-volatile memory M1 according to the received command, and acquires, at S15, the data specified by the command, from the non-volatile memory M1. The communication control unit M2 transmits, at S16, the data acquired at S15 to the device control unit 120. The data is transmitted in the frame structure of FIG. 3A.

FIG. 5B is a communication sequence diagram when the cartridge 10 is implemented on the type-B image forming apparatus. At S20, the device control unit 120 starts supplying power to the storage device M by the power supply unit 108. When the power supply is started, the communication control unit M2 accesses the non-volatile memory M1 at S21 in order to read code information, and acquires code information which is 0 (initial value) at S22. The value is stored in the volatile memory M21. The device control unit 120 transmits, at S23, a change command, which changes the frame structure to FIG. 3B, to the communication control unit M2. The change command is transmitted in the frame structure of FIG. 3A. The communication control unit M2 changes the code information of the volatile memory M21 to 1 at S24 according to the received change command. Here, it is assumed in the example of FIG. 5B that no change is required of the code information stored in the non-volatile memory M1. The communication control unit M2 notifies, at S25, the device control unit 120 of completion of the change. The data is transmitted in the frame structure of FIG. 3A.

Subsequently, the device control unit 120 transmits a command to the communication control unit M2 at S26. The command is transmitted in the frame structure of FIG. 3B. The communication control unit M2 accesses the non-volatile memory M1 at S27 according to the received command, and acquires, at S28, the data specified by the command, from the non-volatile memory M1. The communication control unit M2 transmits, at S29, the data acquired at S28 to the device control unit 120. This data is transmitted in the frame structure of FIG. 3B.

In the sequence of FIG. 5B, the code information stored in the non-volatile memory M1 is not changed from the initial value. Therefore, for example, the cartridge 10, which has once been attached to the type-B image forming apparatus, can be attached to and used on the type-A image forming apparatus. When, however, power supply to the storage device M is stopped in a state in which the cartridge 10 is attached to the type-B image forming apparatus, the type-B image forming apparatus must first instruct by a change command after power supply is resumed to change the frame structure to be used. Therefore, when it is intended to keep using the cartridge 10 which has once been attached to the type-B image forming apparatus, the code information stored in the non-volatile memory M1 can be changed to 1 according to the change command. Whether or not to change the code information stored in the non-volatile memory M1 to 1 may be determined based on user setting. Here, the image forming apparatus memorizes that the code information stored in the non-volatile memory M1 is changed to 1 according to the change command. In such a case, the type-B image forming apparatus can immediately acquire various information stored in the non-volatile memory M1 without changing, according to the change command, the frame structure to be used, after power supply is resumed. In addition, the type-B image forming apparatus can also return the code information stored in the non-volatile memory to 0, according to the change command. Therefore, the cartridge 10 which has once been attached to the type-B image forming apparatus can be attached to and used on the type-A image forming apparatus, even when the code information stored in the non-volatile memory M1 is changed to 1.

As has been described above, the code information indicating a frame structure to be used is preliminarily stored in the non-volatile memory M1. Here, it is assumed that the initial value of the code information is for a frame structure that uses an error detection code of a short code length. In other words, the frame structure is intended to be used by an image forming apparatus of an older generation. A new-generation image forming apparatus that uses an error detection code of a long code length then instructs a change of the frame structure at the start of communication. Note that, on this occasion, the new-generation image forming apparatus uses a frame structure having a short code length which is used by an older-generation image forming apparatus. Since the data length required to instruct a change of the frame structure is short, it is possible to detect an error with a high precision even when the code length is short. Such a configuration allows for performing communication in a plurality of models using different code lengths. In addition, with a new-generation image forming apparatus that uses a long data length to transmit and receive, it is possible to use an error detection code of a long code length, and therefore possible to perform highly reliable communication even when the data length is long.

Second Embodiment

Figure 6A:
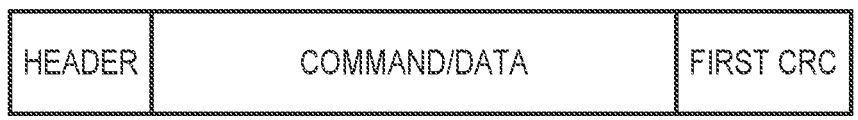
FIGS. 6A and 6B illustrate a frame structure according to an embodiment.
Figure 6B:
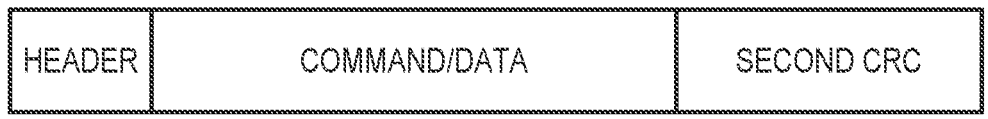

Next, the second embodiment will be described focusing on differences from the first embodiment. FIG. 6A illustrates a frame structure used in communication between the type-A image forming apparatus and the storage device M, and FIG. 6B illustrates a frame structure used for communication between the type-B image forming apparatus and the storage device M. The frame structure of FIG. 6A is the same as that of FIG. 3A. On the other hand, the frame structure of FIG. 6B is the frame structure of FIG. 3B with the first CRC being excluded.

Figure 7:
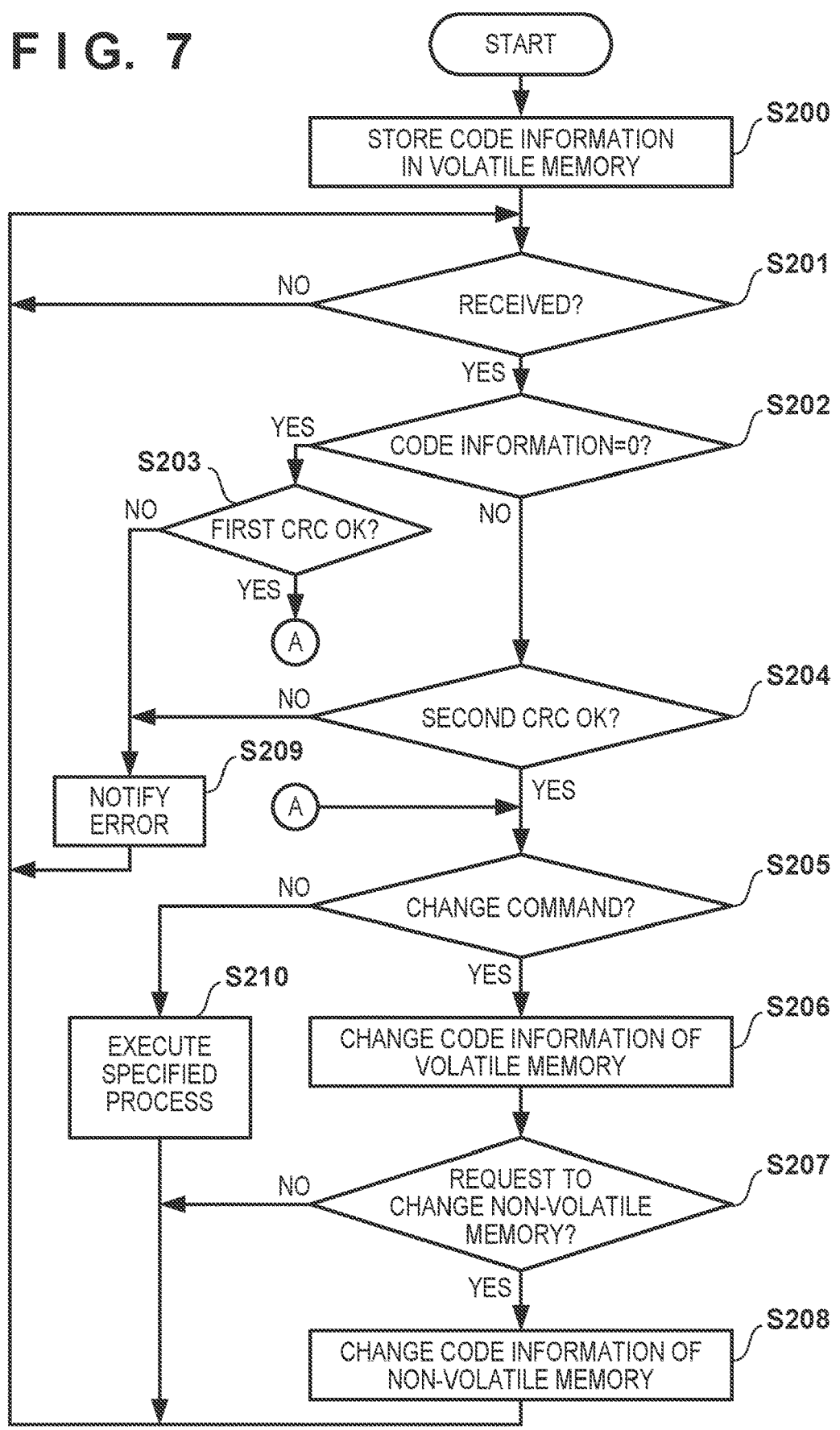
FIG. 7 is a flowchart of a communication process executed by a storage device according to an embodiment.

FIG. 7 is a flowchart of a communication process performed by the communication control unit M2 in the present embodiment. The process of FIG. 7 starts by starting power supply to the storage device M by the power supply unit 108. At S200, the communication control unit M2 reads code information from the non-volatile memory M1 and stores it in the volatile memory M21. Here, the initial value of the code information stored in the non-volatile memory M1 is 0. The communication control unit M2 waits until a command is received from the device control unit 120 at S201. Upon receiving the command, the communication control unit M2 determines the value of the code information of the volatile memory M21 at S202. When the value of the code information is the initial value of 0, the communication control unit M2 checks, at S203, whether or not an error has occurred based on the first CRC. When an error has occurred, the communication control unit M2 notifies the device control unit 120 at S209 that an error has occurred and repeats the process from S201. When, on the other hand, no error has occurred, the communication control unit M2 advances the process to S205. In addition, when the value of the code information is 1 at S202, the communication control unit M2 checks, at S204, whether or not an error has occurred based on the second CRC. When an error has occurred, the communication control unit M2 notifies the device control unit 120 at S209 that an error has occurred and repeats the process from S201. In addition, when no error has occurred, the communication control unit M2 advances the process to S205. The processes from S205 to S208 and S210 are similar to those from S105 to S108 and S110 of FIG. 4.

Figure 8:
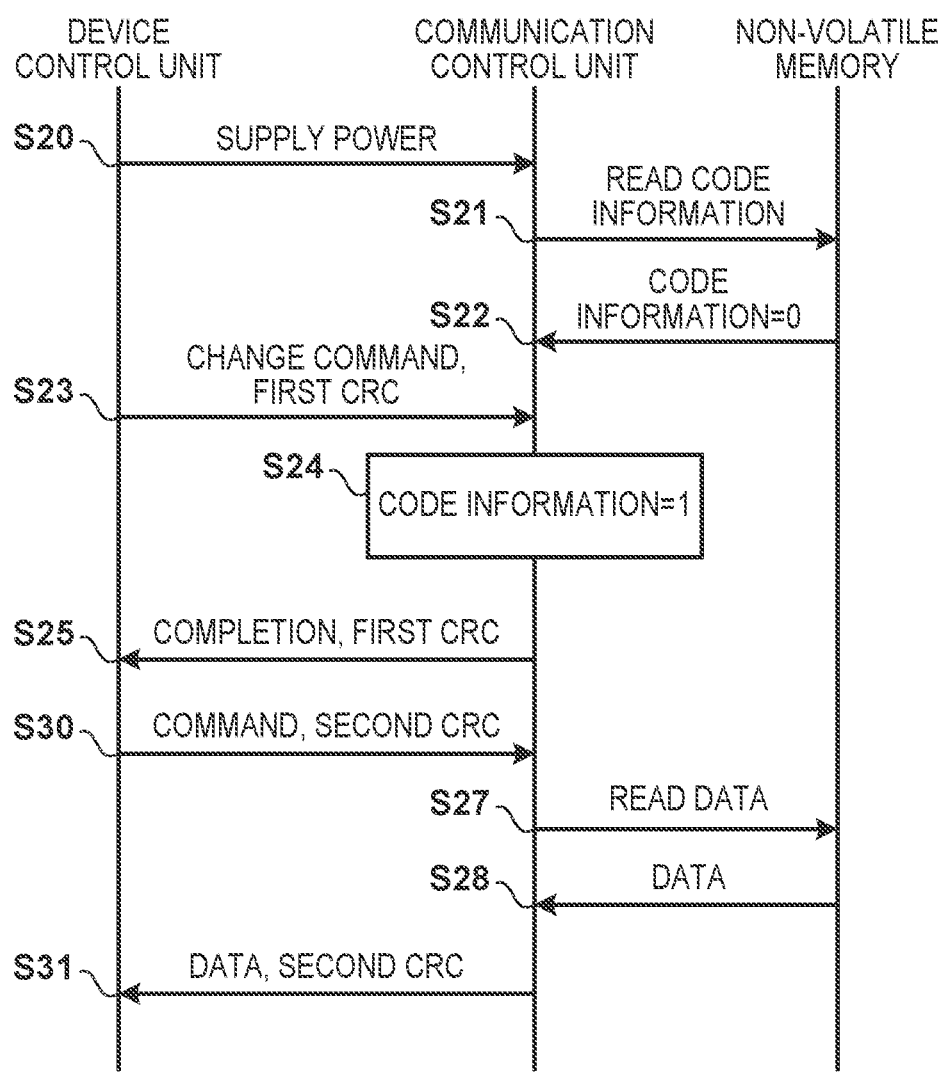
FIG. 8 is a sequence diagram of communication between a main body of an image forming apparatus and a storage device according to an embodiment.

FIG. 8 is a communication sequence diagram when the cartridge 10 is implemented on the type-B image forming apparatus. Note that the communication sequence when the cartridge 10 is implemented on the type-A image forming apparatus is similar to that of FIG. 5A. Here, steps in the sequence illustrated in FIG. 8 that are similar to those of FIG. 5B are provided with same step numbers, with description thereof being omitted. In the present embodiment, S26 and S29 of FIG. 5B are changed to S30 and S31, respectively. At S30 and S31, a frame structure lacking the first CRC illustrated in FIG. 6B is used.

As has been described above, the present embodiment can also perform communication in a plurality of models using different code lengths. In addition, with a new-generation image forming apparatus that uses a long data length to transmit and receive, it is possible to use an error detection code with a long code length, and therefore possible to perform highly reliable communication even when the data length is long.

Note that, although the embodiments have been described taking as an example a case where the cartridge 10 is the replaceable unit, the present invention can be applied to any replaceable unit of an image forming apparatus. In addition, the present invention can be applied not only to an image forming apparatus, but also to any apparatus that is attached with a replaceable unit provided with a storage device and accesses information stored in the storage device of the replaceable unit.

In addition, although the aforementioned embodiments have been described taking as an example a case where same error detection codes have different code lengths, an error detection code used by an old model and an error detection code used by a new model may be different. In other words, the new-generation image forming apparatus and the replaceable unit are configured so that they can selectively use both an error detection code that cannot be used by the old-generation image forming apparatus and an error detection code that can be used by the old generation image forming apparatus. Accordingly, the non-volatile memory of the replaceable unit has preliminarily stored therein a value indicating an error detection code used by the old-generation image forming apparatus as the initial value of the code information. The new-generation image forming apparatus first uses an error detection code used by the old-generation image forming apparatus, and transmits, to the replaceable unit, a change command that changes to an error detection code used by the-new generation image forming apparatus. Such a configuration allows communication between image forming apparatuses of different generations that use different configurations of the error detection code and replaceable units.

Furthermore, the present embodiment provides a value field in the change command, so that the code information can be changed from 0 to 1 or from 1 to 0. When, however, it is not necessary to change the code information from 1 to 0, the value field may be omitted. Furthermore, the frame structure, which is not limited to that illustrated in FIGS. 3A to 3C, or FIGS. 6A and 6B, may be one that includes a footer indicating the end of the frame, for example.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-025399, filed Feb. 18, 2020, which is hereby incorporated by reference herein in its entirety.

What is claimed is:

1. A replaceable unit to be attached to a main body of an apparatus, the replaceable unit comprising:
   a communication unit configured to perform communication with the main body;
   a non-volatile memory storing code information indicating whether a configuration of an error detection code applied to data transmitted and received in the communication is a first configuration or a second configuration; and
   a volatile memory, wherein
   the communication unit is further configured to store, in the volatile memory, the code information stored in the non-volatile memory, execute the communication in accordance with the code information stored in the volatile memory, and, upon receiving data indicating a change command from the main body, update the code information stored in the volatile memory in accordance with the change command,
   the first configuration uses an error detection code of a first code length,
   the second configuration uses an error detection code of a second code length that is longer than the first code length, and
   the first configuration is used for the change command in order to change from the first configuration to the second configuration.

2. The replaceable unit according to claim 1, wherein the communication unit is further configured to, when power supply from the main body is started, store, in the volatile memory, the code information stored in the non-volatile memory.

3. The replaceable unit according to claim 1, wherein an initial value of the code information stored in the non-volatile memory indicates the first configuration.

4. The replaceable unit according to claim 1, wherein
   the first configuration uses only the error detection code of the first code length, and
   the second configuration uses both the error detection code of the second code length and the error detection code of the first code length.

5. The replaceable unit according to claim 4, wherein when using the second configuration, the communication unit is further configured to detect an error in the data by the error detection code of the second code length, and detect an error in the data or the error detection code of the second code length by the error detection code of the first code length.

6. The replaceable unit according to claim 1, wherein
   the first configuration uses only the error detection code of the first code length, and
   the second configuration uses only the error detection code of the second code length.

7. The replaceable unit according to claim 1, wherein
   the change command includes information indicating whether or not to update the code information stored in the non-volatile memory, and
   the communication unit is further configured to update the code information stored in the non-volatile memory in accordance with the change command, in a case where the change command indicates updating the code information stored in the non-volatile memory.

8. The replaceable unit according to claim 1, wherein the replaceable unit is a replaceable unit for an image forming apparatus.

9. An apparatus to be attached with a replaceable unit including a storage device, the apparatus comprising:
   a communication unit configured to perform communication with the storage device, the communication unit being configured such that a first configuration and a second configuration are selectively usable as a configuration of an error detection code applied to data transmitted and received in the communication, wherein the communication unit is configured to transmit, in the first configuration, data indicating a change command for changing from the first configuration to the second configuration, the first configuration uses an error detection code of a first code length, and the second configuration uses an error detection code of a second code length that is longer than the first code length.

10. The apparatus according to claim 9, wherein the storage device includes a non-volatile memory storing code information indicating which of the first configuration and the second configuration is used in the communication, and the change command includes information indicating whether or not to update the code information stored in the non-volatile memory.

11. The apparatus according to claim 10 further comprising:

a power supply unit configured to supply power to the storage device of the replaceable unit; and a storage unit configured to store information indicating whether the code information stored in the non-volatile memory is updated to the second configuration in accordance with the change command, wherein the communication unit is further configured to, in a case where information indicating that the code information is updated to the second configuration is not stored in the storage unit, transmit, in the first configuration, data indicating a change command for changing from the first configuration to the second configuration, when the power supply unit starts supplying power to the storage device.

12. The apparatus according to claim 9, wherein the apparatus is an image forming apparatus.

13. A replaceable unit that is usable on a main body of an apparatus of a plurality of types, the replaceable unit comprising:

a communication unit configured to perform communication with the main body;

a non-volatile memory storing code information indicating whether a configuration of an error detection code applied to data transmitted and received in the communication is a first configuration or a second configuration; and a volatile memory, wherein the communication unit is further configured to store, in the volatile memory, the code information stored in the non-volatile memory, execute the communication in accordance with the code information stored in the volatile memory, and, upon receiving data indicating a change command from the main body, update the code information stored in the volatile memory in accordance with the change command, the first configuration uses an error detection code used by a main body of a first type among the plurality of types, the second configuration uses an error detection code used by a main body of a second type of a newer generation than the first type among the plurality of types, and the first configuration is used for the change command for changing from the first configuration to the second configuration.

14. An apparatus to be attached with a replaceable unit including a storage device, the apparatus comprising:

a communication unit configured to perform communication with the storage device, the communication unit being configured such that a first configuration and a second configuration are selectively usable as a configuration of an error detection code applied to data transmitted and received in the communication, wherein the communication unit is further configured to transmit, in the first configuration, data indicating a change command for changing from the first configuration to the second configuration, the first configuration uses an error detection code that can be used by an apparatus of an older generation than the apparatus, and the second configuration uses an error detection code that cannot be used by an apparatus of an older generation than the apparatus.

* * * * *